(12) United States Patent
Salyer (10) Patent No.: US 7,901,580 B2
(45) Date of Patent: Mar. 8, 2011

(54) METHOD, APPARATUS, AND PROCESSES FOR PRODUCING POTABLE WATER UTILIZING REVERSE OSMOSIS AT OCEAN DEPTH IN COMBINATION WITH SHIPBOARD MOISTURE DEHUMIDIFICATION

(76) Inventor: Ival O. Salyer, Flowery Branch, GA (US)

( * ) Notice: Subject to any disclaimer, the term of this patent is extended or adjusted under 35 U.S.C. 154(b) by 0 days.

(21) Appl. No.: 12/481,082

(22) Filed: Jun. 9, 2009

(65) Prior Publication Data

US 2009/0236286 A1 Sep. 24, 2009

(51) Int. Cl.
- B01D 61/00 (2006.01)
- B01D 63/00 (2006.01)
- B01D 3/10 (2006.01)
- E02B 15/00 (2006.01)
- C02F 3/12 (2006.01)
- F25D 25/00 (2006.01)
- F25D 17/06 (2006.01)

(52) U.S. Cl. .............. 210/652; 210/195.1; 210/257.2; 210/170.1; 210/170.11; 210/172.2; 203/10; 62/93; 62/427

(58) Field of Classification Search .......... 210/652, 210/195.1, 257.2, 170.1, 170.11, 170.2; 62/93, 62/427; 203/10
See application file for complete search history.

(56) References Cited

U.S. PATENT DOCUMENTS

| | | |
|---|---|---|
| 3,632,505 A | 1/1972 | Nelson |
| 4,437,318 A * | 3/1984 | Werjefelt .................... 62/93 |
| 4,452,696 A * | 6/1984 | Lopez .................... 210/170.11 |
| 5,229,005 A * | 7/1993 | Fok et al. .................... 210/652 |
| 5,366,635 A * | 11/1994 | Watkins .................... 210/651 |

(Continued)

FOREIGN PATENT DOCUMENTS

JP 59066391 4/1984

(Continued)

OTHER PUBLICATIONS

Paolo Pacenti, et al., Submarine Seawater Reverse Osmosis Desalination System, European Desalination Society and the International Water Services Association, Desalination 126, 1999, pp. 213-218, Europe.

Primary Examiner — Ana M Fortuna
(74) Attorney, Agent, or Firm — Dinsmore & Shohl LLP (57) ABSTRACT

Devices and methods for producing purified water. The device includes a reverse osmosis subsystem, a dehumidification subsystem and a purified water storage tank fluidly coupled to the subsystems such that purified water produced by each can be locally stored. A vehicular platform, such as a ship, can be used to locate the device adjacent a supply of saline water and humid air. A saline water inlet, membrane and purified water outlet cooperate in the reverse osmosis subsystem to allow preferential passage of water relative to salt in a saline water supply, while the dehumidification subsystem includes a heat exchanger that extracts moisture from the ambient humid air. Purified water produced by each of the subsystems can be used as a potable water source. When used in conjunction with a ship, part or all of the reverse osmosis subsystem can be submersed to a depth sufficient to generate a hydrostatic pressure that is in turn sufficient to passively operate the reverse osmosis membrane such that additional pressurizing equipment, such as a pump, is not needed. Furthermore, the temperature of the water purified by the reverse osmosis subsystem may be low enough to be used as a condensing agent for the ambient humid air passing through the dehumidification subsystem.

18 Claims, 3 Drawing Sheets

U.S. PATENT DOCUMENTS

| | | |
|---|---|---|
| 6,190,556 B1 | 2/2001 | Uhlinger |
| 6,375,849 B1 * | 4/2002 | Crabtree et al. ............. 210/652 |
| 6,904,767 B1 * | 6/2005 | Wright ............................ 62/427 |
| 7,081,205 B2 | 7/2006 | Gordon et al. |
| 7,225,620 B2 | 6/2007 | Klausner |
| 7,306,724 B2 | 12/2007 | Gordon |
| 7,416,666 B2 | 8/2008 | Gordon |
| 7,510,658 B2 * | 3/2009 | Gordon ........................ 210/652 |
| 2003/0217766 A1 | 11/2003 | Schroeder et al. |

FOREIGN PATENT DOCUMENTS

| | | |
|---|---|---|
| WO | 9729049 | 8/1997 |

* cited by examiner

METHOD, APPARATUS, AND PROCESSES FOR PRODUCING POTABLE WATER UTILIZING REVERSE OSMOSIS AT OCEAN DEPTH IN COMBINATION WITH SHIPBOARD MOISTURE DEHUMIDIFICATION

BACKGROUND OF THE INVENTION

The present invention relates generally to an apparatus and process for producing potable water using a combination of reverse osmosis (RO) and dehumidification, and more particularly to a combination of shipboard RO and dehumidification to extract and store potable water from a saltwater supply.

A concomitant to an increase in global population is the need for potable water for human consumption, as well as for industrial, agricultural and other uses. Because the availability of freshwater supplies is limited by size, cleanliness and lack of accessibility, there exists a need for creating potable water from other sources. Stewardship measures such as conservation and reuse, while laudable, will not in and of themselves be sufficient to meet the increase in worldwide water demand.

The world's seas and oceans are the most notable source of yet relatively untapped water. Unfortunately, their high saline content precludes their use as a supply of potable water. Traditionally, the desalination of sea water is accomplished using land-based facilities, typically relying upon either active evaporative or reverse osmosis (RO) techniques. In the former, the salty water is first vaporized, then condensed in such a way as to isolate the relatively salt-free distillate. Active evaporation is expensive, requiring vast amounts of energy (typically in the form of a combustible heat supply).

The latter approach involves using high pressure to force the salty water through a membrane that is relatively impermeable to salt ions or other contaminants, thereby allowing a more pure form of the water to pass through the membrane. Traditional RO approaches typically involve some amount of pre-treatment, filtration, and final treating. Pre-treatment may include screen and physical filtration (often with carbon filters), as well as chemical pre-treatment, which may include scaling and biological prevention. From the pre-treatment, the water is then sent to the membrane for desalination and filtration. Membranes used in RO for the desalination of sea water come in four primary physical structures. These are spiral, tubular, plate and frame, and hollow fiber systems. Spiral systems are made up of two concentric tubes (typically about 8" and 2" in diameter) the length of which is dependent on system pressure and the concentration of solids in the raw water. The actual membrane is typically a flat sheet with one end open to the water and the other ending in the smaller of the two tubes. The membrane is then spiraled around the inner tube and placed inside the larger tube. Raw water enters the larger tube under pressure. Pure water then enters into the membrane and flows along the spiral until it is released into the inner tube where it is transported for final treatment. Concentrated brine then flows out the open end of the larger tube. Tubular and hollow fiber systems are essentially the same design differing only in their relative size. In both cases, membranes are cylindrical fibers or tubes placed in an outer tube. The outer tube is filled with pressurized raw water. The pure filtered water enters the tubes or fibers and is transported down these to final treatment. Concentrated brine flows out of the open end of the outer tube. Plate and frame systems involve a flat surface membrane with the filtering side exposed to raw water and the reverse exposed to the product water chamber. Pressurized raw water is exposed to the filter. The filtered pure water moves through into the collection chamber for processing. Final treatment involves the balancing and treating of mineral content in the water, as well as balancing the acidity of the water. Additionally, ultraviolet (UV) rays or chlorination can be employed to control future biological and pathogenic contamination.

As with the active evaporation process discussed above, land-based RO facilities suffer from various shortcomings. For example, because RO facilities generate significant quantities of dissolved solids and related effluent, release of such byproducts could be harmful if reintroduced in localized, concentrated form into the water supply from which it was derived. Such localized release of effluent would eventually cause the water being taken into the system to become concentrated enough that it can impact the performance of the RO system membranes. To ensure a relatively non-fouled RO water intake, the facility would need to be situated remotely from the point of effluent discharge. Similarly for evaporative systems, local nuisance concerns may mean that there are significant costs associated with keeping the facility at a suitable distance from population centers. In either situation, the solution tends to be cost-prohibitive.

One way to avoid the problems associated with land-based desalination (in particular, land-based RO desalination) is to use a shipboard RO system. In a conventional form, the high pressure requirements are satisfied by mechanical pumps. Such systems, while operationally suitable, are expensive, require significant amounts of energy consumption, and take up precious shipboard space. As an alternative, it has been reported that the necessary pressure differential can be achieved hydrostatically if the RO unit is submersed to a sufficient distance (for example, many hundreds of meters) beneath the ocean surface. Despite improvements in energy efficiency made possible by such a system, there remains a desire to increase the quality of potable water from ship-based platforms over that provided by these or related RO systems, as well as a desire to reduce the impact of RO-based desalination on the local environment from which the water was extracted.

BRIEF SUMMARY OF THE INVENTION

These needs are met by the present invention, where in accordance with a first aspect of the present invention, features of a system made up of each RO and evaporative components work together for water desalination. The system includes an RO subsystem, a dehumidification subsystem, at least one purified water storage tank and a vehicular platform onto which the RO and dehumidification subsystems and the purified water storage tank (or tanks) are mounted. The tank is fluidly coupled to the RO subsystem and the dehumidification subsystem such that purified water produced by each is stored in the tank. The RO subsystem includes a saline water inlet, a purified water outlet fluidly downstream of the inlet and between them an RO membrane that acts as a filter for salts and other contaminants by allowing passage of water through it while inhibiting the passage of such undesirable features present in a saline water supply. The dehumidification subsystem is a passive system, which differs from an active system in that it doesn't require a combustion or related source in order to achieve an appreciable measure of separation of the airborne salts or related minerals or impurities from a humid ambient air supply. In such a passive approach, the system uses water purified by the RO subsystem to act as a coolant to condense at least some of the water contained in this ambient air.

Optionally, the vehicle can include any mechanized equipment used to convey the purified water. In a preferred form, the vehicle is a watercraft, such as a ship, boat, submarine or the like. In another option, the RO subsystem extracts potable water from the saline water supply by passive means, rather than through active means, such as pumping. In the present context, passive means could result from differences in hydrostatic pressure between the inlet and the outlet, movement of the inlet to force higher quantities of flow therein or other means that don't rely on pumps or other such devices. In a preferred form, the ship is large enough to function as a storage of both the system and significant quantities of purified water. In one such form, the ship weighs at least 40,000 tons, although any midsize tanker (i.e., one big enough to contain multiple RO units in their docking stations and hold an appropriately-sized dehumidification unit) would be acceptable. While larger ships could be used in conjunction with the present invention, their use must be able to operate within the constraints of the ports into which they would need to navigate.

The watercraft further may include pipes, pumps, valves and related fluid handling equipment to facilitate conveying the purified water to a tank on another watercraft, the land or elsewhere. In yet another option, the dehumidification subsystem is positionable relative to the ambient air supply such that the amount of the ambient air that interacts with the dehumidification subsystem is maximized. The RO subsystem may more particularly include a container and an RO unit fluidly connected to the container. In one form, the purified water produced at the membrane can be at least temporarily stored in the container, for example, at least until fluid communication can be established between the container and one or more of the onboard storage tanks, or until such time as the purified water in the container can be used by the dehumidification subsystem to help condense water vapor present in the ambient air. As stated above, the one or more storage tanks can be made up of numerous such tanks fluidly coupled to and spaced from one another. For example, by placing them at select remote locations in the ship (such as at opposing sides or corners thereof), the tanks can be used as a balancing system, where the purified water stored in the numerous tanks can be allocated in such a way to promote hydrostatic balancing within the ship.

In another option, the dehumidification subsystem may include a screen or related porous device through which a breeze, the wind or the like can carry the ambient air. Porous members located in the dehumidification subsystem allow the wicking of water (in the form of humidity in the ambient air) into a flowpath that drains into an appropriate trough or related sluice. Motors, winches or the like can be used to reposition the screen of the dehumidification subsystem so that it best aligns with the prevailing winds to take best advantage of the system's evaporative capabilities.

The system may further include a positioning mechanism that permits movement of at least the RO subsystem through various depths of the saline water supply. In this way, briny water being discharged from the RO subsystem is done so over a larger space, thereby reducing the likelihood of the briny water corrupting the water supply. In the present context, briny water is any such water that, when reintroduced into the supply from where it came, has a higher salt concentration that of the surrounding supply. For example, if the saline water supply is the sea, ocean or related body of water, the briny water would be that produced by the higher salinity RO subsystem discharge that is in turn placed back into the body of water. Thus, one purpose of continuous operation of the positioning mechanism associated with the RO subsystem during the lowering and raising of the RO unit is that the briny concentrate leaving the RO unit is dispersed over a very large area and therefore would not result in a significant difference in the salinity of the water through which is passes. An additional benefit is that this would prevent debris from accumulating on the surface of the membrane in the RO unit.

Such a mechanism, may include a motor, winch and cable or related coupling apparatus that together permit the subsystem to be moved through various depths of the saline water supply. In addition to being fluidly connected to the RO unit, the container may include pressure regulating apparatus to control internal container pressure. For example, where an evacuation process is needed (such as prior to lowering the RO unit into the water), such pressure regulating apparatus can be used to promote container evacuation, which in turn allows the RO water storage container to fill completely without back pressure. A controller may be used to operate the various components of the mechanism, as well as the water-gathering equipment of the RO subsystem.

According to another aspect of the present invention, a shipboard water desalination apparatus is disclosed. The apparatus includes an RO subsystem with a saline water inlet, a purified water outlet and a membrane, a dehumidification subsystem and one or more storage tanks for the collection of purified water. As with the previous aspect, the membrane allows preferential passage of water relative to salt in a saline water supply such that the water that passes through the membrane has a reduced salt content (as well as that of other contaminants) relative to that of the supply. The RO subsystem is further configured as a passive device. In this way, pumps or related equipment that are needed in conventional RO system to attain the high inlet pressures necessary to force the water through the membranes are not required, as a hydrostatic pressure of the saline water supply present at the saline water inlet (due, for example, to at least the inlet of the apparatus being situated at a significant subsurface depth) is sufficient to pass water from the water supply through the membrane. Such passive pressure may be produced from the system operating at depth where water is at maximum density, such as where the water temperature is as close to 2° Celsius as possible. As with the previous aspect, continuous movement of the RO unit eliminates the accumulation of debris on the surface of the RO membrane that could otherwise cause problems in stationary RO units in use. Also as with the previous aspect, the dehumidification subsystem can at least partially condense water present in an ambient air supply. Preferably, the dehumidification subsystem avoids the use of salinated water as a cooling agent to reduce the risk of subsystem contamination and related fouling. In addition, using a cold water supply (such as the purified water from the RO subsystem) as the source of the temperature differential allows the dehumidification system to operate around the clock (i.e., experience a larger duty cycle) with greater efficiency because even at night (with a concomitantly cooler air temperature), the temperature differential would still be enough to allow subsystem operation, as the relatively cold temperature of the water accumulated in a container or containers used in the RO subsystem helps provide a temperature differential that makes the dehumidification unit of the dehumidification subsystem work.

Optionally, the apparatus includes first and second positioning mechanisms, where the first is used with the RO subsystem to raise and lower the RO subsystem in the saline water supply, while the second positioning mechanism is used with the dehumidification subsystem such that the dehumidification subsystem can be preferentially oriented relative to the ambient air supply. In one form, the second positioning mechanism can include motors and related gearing or related components necessary to rotate or otherwise turn the dehumidification subsystem's screen, wall or related air-to-fluid heat exchanger. Such positioning mechanism may further include a controller (such as a microprocessor-driven controller) to move the heat exchanger of the dehumidification subsystem such that the heat exchanger can be automatically positioned to take best advantage of the prevailing winds. Such is preferable to having to reorient a ship (especially larger-class ships) to take best advantage of such winds. The first positioning mechanism cooperative with the RO subsystem can be operated such that if the RO subsystem is mounted on a frame, sled or related support, the first positioning mechanism can be employed to raise and lower the support in the water to both attain the desired depth necessary to produce the elevated hydrostatic pressures required of the membrane, as well as keep the RO subsystem moving relative to the ambient saline water supply. This latter movement, by virtue of its spreading the RO subsystem effluent over a constantly-changing waterscape, is helpful in avoiding too large of a brine buildup in a single location adjacent the RO subsystem outlet. In one preferred form, the water collected from the RO and dehumidification subsystems is potable water that can later be conveyed (such as through piping, pumping, valving and associated controller systems) to a remote storage facility, private or municipal water supply or the like. Thus, for example, the controller can be used to operate various compressors, vacuum pumps, valves or the like to ensure proper conveyance of the purified water to a predetermined storage location. As with the previous aspect, the reduced salinity (i.e., purified) water coming from the RO subsystem can be used to condense water vapor contained in the ambient air supply that comes into contact with the dehumidification subsystem.

According to another aspect of the present invention, a method of purifying a saline water supply is disclosed. The method includes introducing an RO subsystem comprising a saline water inlet, a purified water outlet fluidly downstream of the inlet and a membrane disposed fluidly between the inlet and the outlet into the saline water supply to a sufficient depth to promote RO through the membrane. The method also includes condensing at least some of the moisture present in a supply of humid air by a heat exchanger in a dehumidification subsystem. In the present context, humid air is any ambient air with a high enough moisture content to allow it to readily condense out when exposed to an aqueous heat exchange fluid (for example, cold purified water produced by the RO subsystem). As such, an ambient air supply with a relative humidity of greater than 50% would be considered to be humid air, while an ambient air supply with a relative humidity of around 10% would not. In addition to having a relative humidity of 50% or greater, it is desirable to have the ambient air be at an air temperature of 70° Fahrenheit or greater. As such, tropical locations, which often exhibit both high air temperatures and relative humidity, are advantageously used with the system of the present invention. Under such an arrangement, fresh (i.e., potable) water can be extracted from latent atmospheric humidity in hot, humid climates. The method further includes collecting purified water from the RO subsystem and the dehumidification subsystem in a storage tank.

Optionally, introducing the RO subsystem includes moving the RO subsystem during its operation as a way to reduce brine concentration in the adjacent water, in effect spreading out the briny water flowing out of the RO unit over a larger area. In one form, the condensing may include using one or more of the saline water supply and the purified water produced in the RO subsystem as a cooling liquid in the heat exchanger, which is preferably configured as a liquid-air heat exchanger. In a preferable option, the RO and dehumidification subsystems, as well as the storage tank, are mounted to or otherwise integrated onto a ship or related watercraft. As previously discussed, the storage tank may be made up of a series of separate tanks that can be interconnected through appropriate piping, valving and pumping apparatus. Placement of various storage tanks around the ship (such as around the ship periphery) can be used with such apparatus to advantageously promote ship balance by moving the stored potable water between the various tanks. In another option, the heat exchanger can be positioned, such as by rotating it relative to the ship or the supply of humid air to maximize heat exchange interaction.

In another option, the depth in the saline water supply is sufficient to give the local water supply enough driving force (by virtue of its elevated hydrostatic pressure) to pass the saline water supply through the membrane without the need to further pressurize the water supply through pumps or other mechanical, electromechanical or related means. In another option, the RO subsystem is introduced into the water supply in a predetermined fashion to most economically reach the desired pressurization levels at the RO subsystem membrane. For example, the method may first include lowering the RO subsystem to a first depth sufficient to create at least 600 pounds per square inch pressure at the membrane, and then lowered to a depth sufficient to create about 1500 pounds per square inch pressure at the membrane. The lowering rate of the RO subsystem between the condition where the pressure on the membrane is at least 600 pounds per square inch (psi) and the condition where the pressure on the membrane is about 1500 psi is preferably between about 1 foot per minute and about 60 feet per minute. In a more preferred form, the lowering rate is about 20 feet per minute. In another option, the purified water stored in the one or more storage tanks or the RO subsystem can be sampled, tested, analyzed or the like to determine that it is of sufficient purity for its intended purpose. For example, if the water is being used for human consumption and related potable purposes, its salinity level (as well as that of other purity indicia) must meet certain threshold requirements. In this way, an operator may have the option of eliminating poor quality RO water prior to it being brought aboard at all. Such sampling, testing, analyzing or the like may be part of a quality control program, and can be further used to provide indicia of component (for example, membrane) malfunction or failure.

In another option, the containers used to collect the purified RO water in the RO subsystem can be evacuated to a low pressure prior to being lowered into the ocean or related saline water supply. In one form, the pressure can be reduced to less than 1 psi to reduce or eliminate the back pressure in the container, thereby allowing it to fill more completely during operation without additional depressurizing being necessary during the cycle. In another option, cleaning steps may be undertaken to eliminate or otherwise reduce the likelihood of fouling from contaminant build-up, such as salt, organic matter or the like. In this way, the purified water can be additionally treated to provide disinfection to eliminate microorganisms. Likewise, additional filtration devices can be used to remove suspended particulates. After such treatment, the purified water collected in the storage container can then pumped out for subsequent use by the dehumidification system, storage in the shipboard storage tanks, or both.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION OF THE PREFERRED EMBODIMENTS

Figure 1:
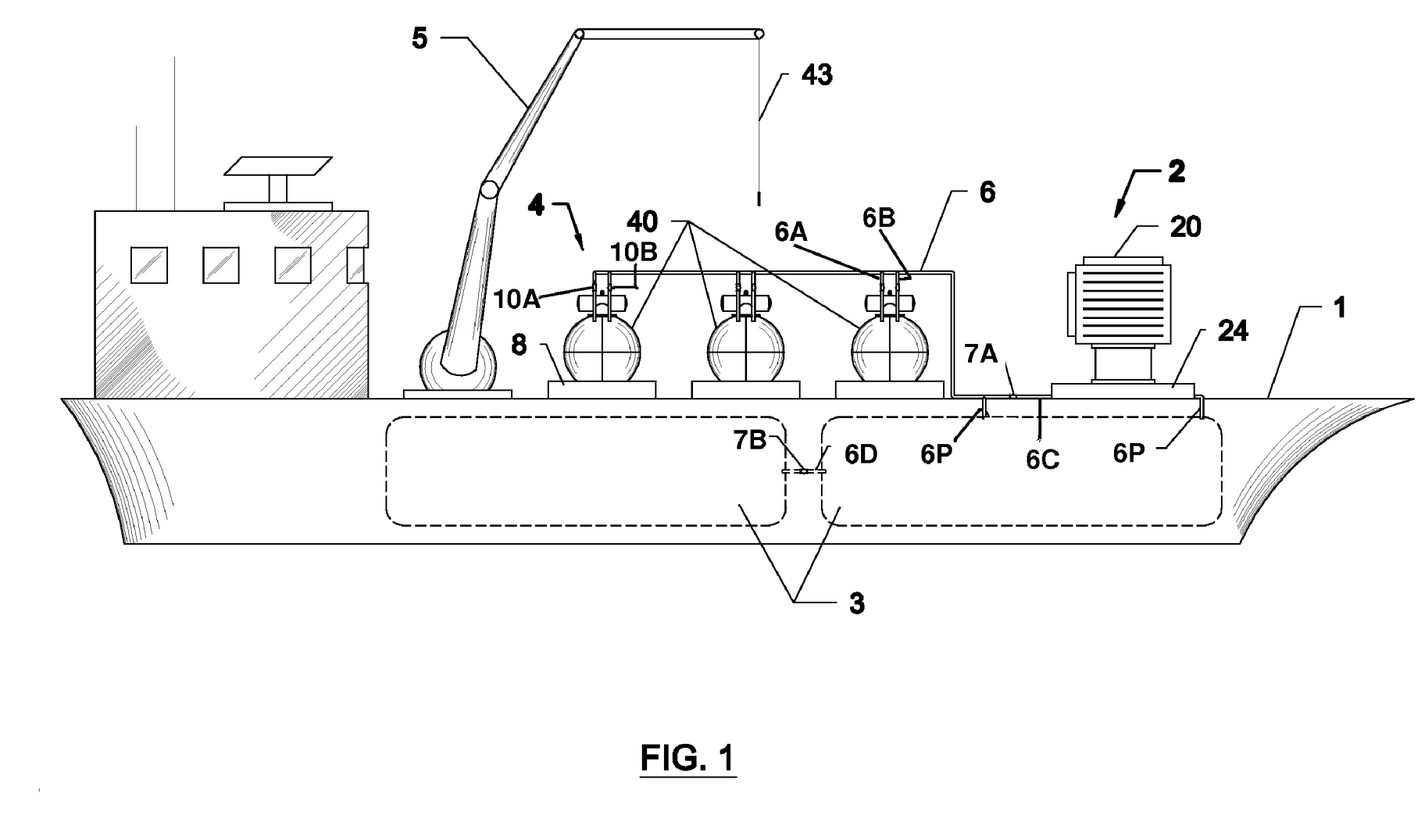
FIG. 1 shows schematically a ship with an on-board water purification system according to an embodiment of the present invention.

Referring initially to FIG. 1, a ship 1 (such as a tanker) outfitted with a potable water generation system according to an aspect of the present invention is shown. Ship 1 includes a dehumidification subsystem 2, one or more purified water storage tanks 3, RO subsystem 4, a crane or winch 5 and piping 6 that can convey the cold water from the RO subsystem 4 storage container to the dehumidification subsystem 2, and tanks 3. In a preferred form, the ship 1 is of a large-displacement variety. For example, the ship 1 may be a minimum 40,000 ton capacity, appropriately designed or modified as shown for the purpose of potable water production and storage. Such size must consider the ease with which ship 1 can navigate into and out of smaller ports and waterways, and it will be appreciated by those skilled in the art that different sizes commensurate with these restrictions are within the scope of the present invention.

The tanks 3 are preferably sterile, while portions of the piping 6 and related valving 7 selectively interconnects them to each other to enable the shifting of the water between compartments to balance the floatation needs of the ship 1 as potable water is accumulated. In a like manner, piping 6 and valving 7 can be used to convey cooling water and purified condensate between the RO subsystem 4, the storage tanks 3 and the dehumidification subsystem 2. Docking stations 8 can be used to secure the RO subsystems 4 while the latter are on the topside of ship 1.

A set of vacuum pumps and compressors (neither of which are shown) are included on ship 1 to act as pressure and vacuum reservoirs that can enable continuous water production, as well as to shorten the length of the potable water production cycle. The vacuum pumps can be used to evacuate water containers 40 (discussed in more detail below), while the compressors can be used as a means of forcing water out of the containers 40 through the piping 6 aboard the ship 1. Such devices, although not necessary, can shorten the time required to move the purified water. The ship 1 can be propelled by conventional means (for example, fossil fuels, nuclear reactor or the like), and preferably have sufficient fuel capacity to remain at sea collecting water for an extended period of time (such as at least one month).

Figure 2:
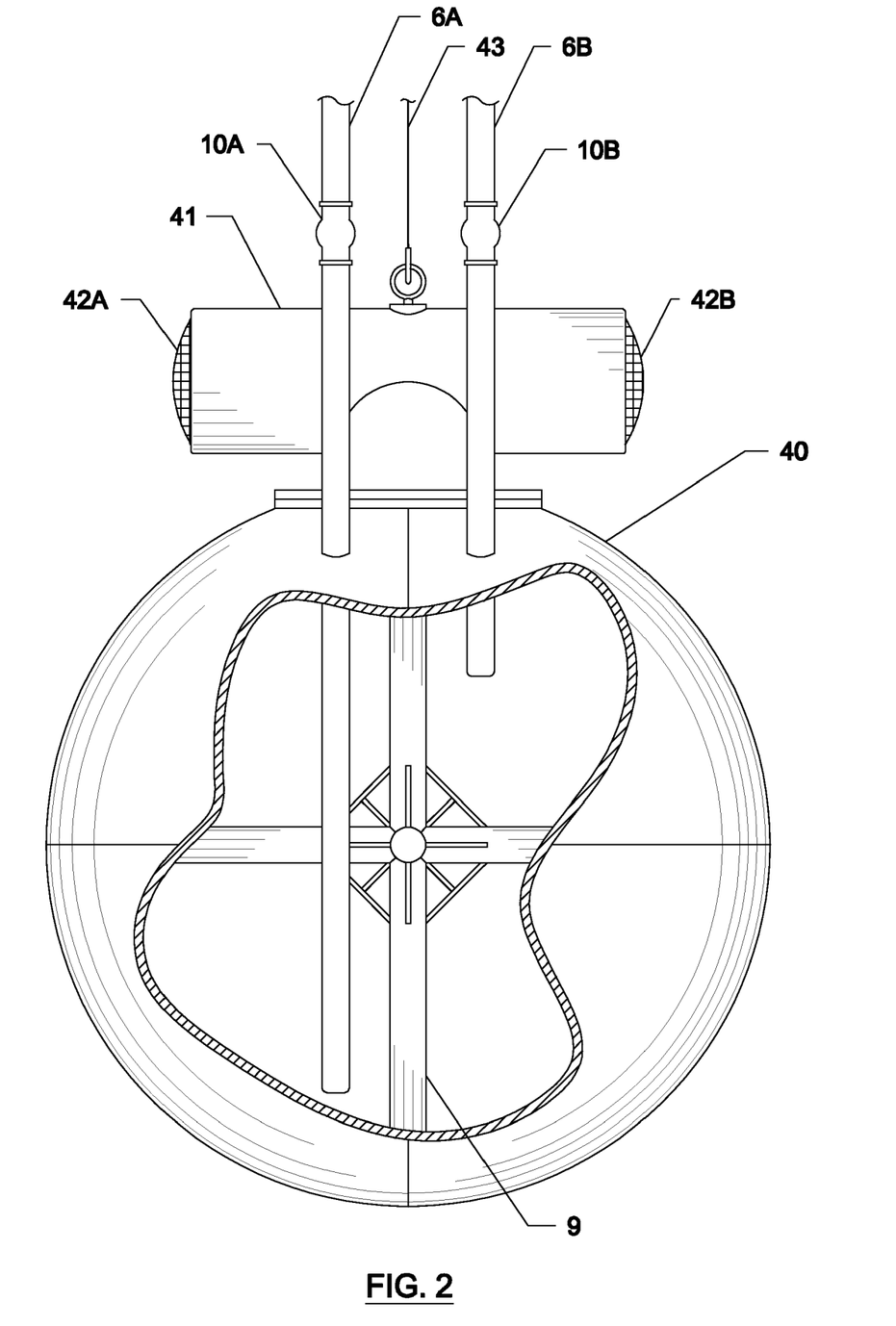
FIG. 2 shows details related to a submersible container and RO subsystem that form part of the on-board water purification system of FIG. 1.

Referring next to FIG. 2, the RO subsystem 4 (which may be procured from a well-known commercial source) includes one or more water containers 40 that should be of design and of such construction as to withstand sea depths of up to 2500 feet or about 1500 psi pressure. While it will be appreciated that any appropriate shape may be used for container 40 (and all such shapes are deemed to be within the scope of the present invention), a generally spherical profile is recognized as providing the best combination of structural efficiency and integrity under the high pressure conditions imposed by deep ocean submersion applications. In one form, each of the containers 40 could be constructed of either metal or a reinforced composite or other appropriate structural material. In one non-limiting form, each container 40 is about six feet in diameter, subject to the weight limitations and pressure factors previously mentioned. In addition, the container 40 can be reinforced with internal spars 9 for added strength, as shown with particularity in the figure. As with tanks 3, the containers 40 perform a purified water storage function, the difference being that the tanks are generally affixed to the ship 1, while the containers 40 can be lowered into the ocean in order to achieve a measure of passive RO performance by virtue of pressure differences across an RO membrane (not shown) from the ocean depths to the inside of the container 40.

The RO subsystem 4 also includes a membrane unit (also called an RO unit) 41 situated adjacent the container 40 and designed to enable the RO subsystem 4 to produce sufficient desalinated product water to fill the container 40 in a relatively short amount of time. In one non-limiting form each container 40 can be filled in approximately two hours. Purified water generated in the RO unit 41 is conveyed to its respective storage container 40 for temporary storage, such as until such time as the container 40 can be brought to the ship 1 topside.

The container 40 should be of a size which can readily be raised from ocean depth by winch 5. The top of each of the spherical containers 40 includes an eyelet, hook or the like with which winch 5 can lift and lower spherical containers 40 by cable 43. Operation of winch 5 can be performed through the controller (not shown) to enable the winch 5 to draw in or let out cable 43 to raise and lower each of the containers 40 at a preferred speed, which in some circumstances may need to be done rapidly, while in others more slowly. Together, winch 5, cable 43 and the controller may make up a positioning mechanism for movement of the RO unit 41 and container 40. Similarly, the controller can be used to manipulate each of the containers 40 into appropriate seating within their respective docking station 8. In one form, the containers 40 can be lowered into the water to a first depth. For example, each container 40 can be lowered to about a 1000 foot depth, which should be sufficient to create approximately 600 psi at an inlet (also known as an intake) 42A of RO unit 41. Once it has attained the sufficient depth or pressure, the container 40 can continue to be lowered, now at a controlled rate, such as between about 1 and 60 feet/minute. In one preferred form, the container 40 can be lowered at about 20 feet/minute. Such lowering continues until a pressure sufficient to enable the RO unit 41 of the RO subsystem 4 to operate is attained. For example, a depth of 2500 feet should generally be sufficient to produce about 1500 psi at the inlet 42A of RO unit 41. The inventor has discovered that continuous operation of the RO subsystem 4 as it is being both lowered and raised avoids brine concentration at the inlet 42A of the RO unit 41, and greatly reduces environmental concerns with brine dispersal since the concentrate will be dispersed over a much broader area. Preferably, the RO unit 41 is fitted with all necessary screens, filters, pretreatment apparatus or the like (none of which are shown) necessary for prolonged deep sea use. Salt and other contaminants that get filtered out by membrane pass out of the RO unit 41 through outlet 42B.

The top of the container 40 is equipped with multiple pipes 6A, 6B, each having respective electric closure solenoid valves 10A and 10B and accompanying vacuum seals (not shown). These pipes 6A, 6B connect the RO subsystem 4 to the storage tanks 3 to maximize flow volume into the container 40. To achieve this, they can be used to evacuate residual air from the container 40 prior to the container 40 being lowered into the ocean or related body of water. The evacuation helps to relieve back pressure, as well as to allow for maximum filling of the container 40. The pipes 6A and 6B can also be used to remove water from the container 40 through an appropriate hose (not shown) that can be used to connect a shipboard suction pump to the pipe 6A which extends into the bottom of the container 40 to allow siphoning out the water contained therein. In an alternate form, a compressor (not shown) can be fluidly connected to the short pipe 6B on the top of the container 40 to exert downward pressure on the water in container 40 to help force it up through the pipe 6A. In this way, the pipes maintain sufficient pressure and vacuum on the containers 40 throughout the water production and retrieval processes. Of the two pipes 6A and 6B, pipe 6A extends lower, reaching nearly to the bottom of the container 40 to allow for the removal of purified product water that is delivered to the container 40 from the adjacent RO unit 41 through piping (not shown). As stated above, valve 10A can be used to selectively close off the open end of pipe 6A to the remainder of the piping 6 that is used to convey the purified water. The other pipe 6B terminates in an opening near the top of the inside of the container 40, and can be used to maintain proper container pressure. As with pipe 6A, pipe 6B can be fitted with an automated closable valve 10B.

In addition to the RO subsystem 4, the ship 1 has a large capacity dehumidification subsystem 2. As shown with particularity in FIG. 3, the dehumidification subsystem 2 includes one or more relatively large surface area ambient air capture screens 20 that can be fluidly coupled through piping 7 to one or more potable water storage tanks 3 such that condensate from the dehumidification subsystem 2 is placed in the potable water storage tanks 3. Capture screen 20 is preferably equipped with hydraulic or mechanical powered devices (such as motor 22) that can position the capture screen(s) 20 to maximize the utilization of prevailing winds that blow across the ship 1. A mounting base 24 allows rotation of capture screen 20 through an appropriate mechanism, such as ball bearings 26 that are mounted to base 24. This arrangement allows a minimum of 180° rotation in response to motor 22. Cooling water, which is used as a condensing agent for capture screen 20, can be introduced from the cold water from the containers 40 of the RO subsystem 4 through piping 6C. In a likewise fashion, potable condensate can be removed from capture screen 20 through piping 6P to be delivered to one or more of the storage tanks 3.

In the proposed mode of operation, ship 1 would be located in a tropical environment, such as the Gulf of Mexico. Locations such as this are desirable because the water has sufficient depth (i.e., approximately 2500 feet) to allow the lowering of the containers 40 of the RO subsystem 4, although it will be appreciated by those skilled in the art that any saltwater environment where such water depth and ambient air conditions exist is equally usable. Prior to immersion of the containers 40 and RO unit 41 of the RO subsystem 4 into the sea, ocean, bay, gulf or related body of water, the container 40 is evacuated to a significant vacuum, such as in a manner discussed above. In one preferred form, the pressure inside the container 40 is reduced to about 1 psi or less (compared to approximately 14.7 psi (i.e., about 760 torr) for standard atmospheric pressure). A pressure indicator on ship 1 can be used to measure pressure in container 40 to indicated how much pressure lowering is required.

Moreover, the rates of RO subsystem 4 ascent and descent can be varied in order to correlate with the capacity of the RO subsystem 4 to process the quantity of water needed to fill the container 40. In one form, the container 40 could be about half filled with product water, at which time the winch 5, cable 43 and container 40 can cooperate to raise the container 40 back toward the surface at about a predetermined ascent speed. In one form, such speed could be about 20 feet/minute. When the RO subsystem 4 reaches the 1000 foot depth level, the solenoid valves 10A, 10B connecting the container 40 to the RO subsystem 4 will be closed, at which time the containers 40 are pulled to the surface as rapidly as possible. In this way, the total length of the RO cycle is reduced, and the operation of the RO process only takes place during those times where the container 40 of the RO subsystem 4 below the depth necessary to generate the pressures needed. Referring again to FIG. 2, when the container 40 reaches the surface of the water, an on-board pressure source (such as from water handling subsystem 30) is connected (via hose, for example) to the upper pipe 6B on top of the container 40. Another connection, this time to lower pipe 6A that extends almost to the bottom of the container 40, can also be made to the water handling subsystem 30. Both valves 10A and 10B are then opened so that pressure from the water handling subsystem 30 is applied to cause the cold desalinated water to flow out of the containers 40 to the shipboard moisture dehumidification subsystem 2 (where it can act as a condensing agent for moist air passing across one or more capture screens 20, and from there, to the shipboard storage tanks 3. As discussed above, each of the containers 40 of the RO subsystem 4 can be sampled, such as for chloride ion content. Likewise, the inlet 42A of the RO unit 41 can be inspected and serviced, if needed.

Figure 3:
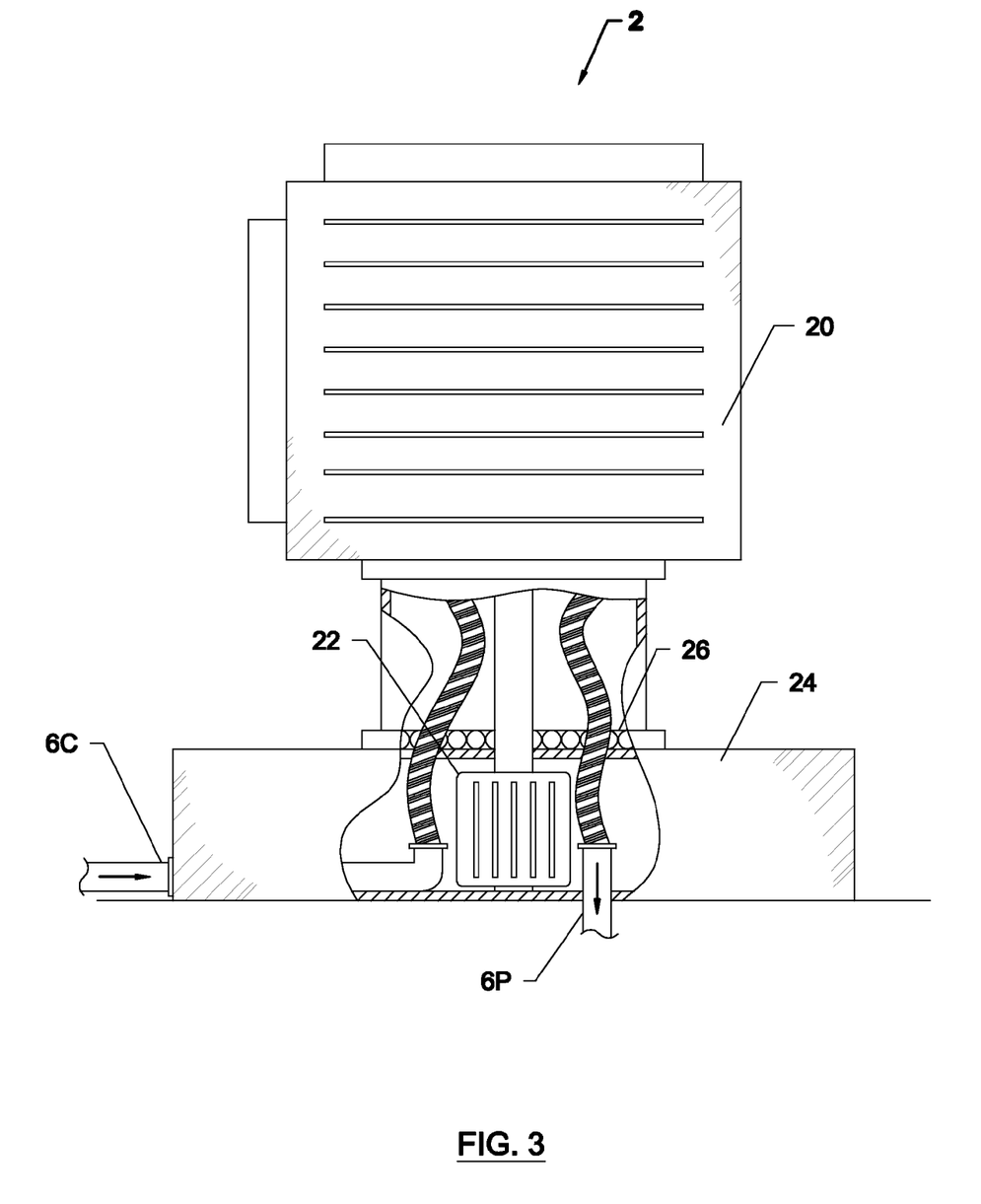
FIG. 3 shows details related to an on-board dehumidification subsystem that forms part of the on-board water purification system of FIG. 1.

Regarding operation of the dehumidification subsystem 2, the temperature differential between the cold RO water in the container 40 and the warm tropical air flowing through the dehumidification subsystem 2 will result in production of substantial quantities of pure water condensate. A trough 24 situated beneath the dehumidification subsystem 2 will funnel the accumulated condensed water vapor out of the dehumidification subsystem 2 so it can then be pumped into the water storage tanks 3 to be joined up with the RO water from the RO subsystem 4 that was used to condense the airborne water vapor that was captured by the dehumidification subsystem 2.

Ship 1 may be equipped with numerous RO subsystems 4 so that the immersion process of the multiple containers 40 and accompanying RO units 41 may be sequenced to provide around-the-clock production of potable water. Likewise, connection of the various containers 40 to the dehumidification subsystem 2 ensures continuous water processing, although it may be that more dehumidification of the ambient air is possible in the daylight hours, where the temperature difference between the air and the RO water is greatest. Furthermore, when the holds of ship 1 are filled and the ship 1 is situated in a port or related docking facility, suitable pumping and related water conveying means can be fluidly coupled to the ship 1 to facilitate delivery of the purified water to the port or other land-based water transfer or storing station. Multiple ships 1 may be employed to ensure substantially continuous operation.

While certain representative embodiments and details have been shown for purposes of illustrating the invention, it will be apparent to those skilled in the art that various changes may be made without departing from the scope of the invention, which is defined in the appended claims.

What is claimed is:
1. A watercraft for producing purified water, said watercraft comprising:
  a passive reverse osmosis subsystem comprising a saline water inlet, a saline water outlet fluidly downstream of said inlet and a membrane disposed fluidly between said inlet and said outlet and configured to allow preferential passage of water relative to salt in a saline water supply passed therethrough;

a water container in fluid communication with said reverse osmosis subsystem to receive purified water that has passed through said membrane;

a passive dehumidification subsystem comprising an air capture device that is in heat exchange communication with said water container to use said purified water there in order to at least partially condense water contained in an ambient air supply that comes in contact with said air capture device;

at least one purified water storage tank fluidly coupled to said water container and said dehumidification subsystem such that purified water resident in each can be conveyed to said at least one tank; and a ship onto which said reverse osmosis subsystem, said water container, said dehumidification subsystem and said at least one tank are mounted.

2. The watercraft of claim 1 wherein said air capture device comprises an air capture screen.

3. The watercraft of claim 1, further comprising a mechanism for moving said water container and at least a portion of said reverse osmosis subsystem through the saline water supply and relative to said ship in order to facilitate introduction of the at least a portion of the saline water supply to said membrane.

4. The watercraft of claim 3, wherein said mechanism for moving said water container and said membrane through the saline water supply is configured to move said container and said membrane through various depths of the saline water supply.

5. The watercraft of claim 1, wherein said dehumidification subsystem is positionable relative to the ambient air supply such that the amount of the ambient air that interacts with said air capture device is maximized.

6. The watercraft of claim 1, wherein said at least one tank further comprises a plurality of tanks fluidly coupled to and spaced from one another is in such a way that the purified water stored in said plurality of tanks can be allocated to promote hydrostatic balancing within said ship.

7. A shipboard water desalination apparatus comprising:

a passive reverse osmosis subsystem comprising a reverse osmosis unit and a container fluidly coupled to said reverse osmosis unit such that upon passage of a saline water supply through a membrane in said reverse osmosis unit, water with a reduced amount of salinity relative to that of said saline water supply is delivered to said container;

a passive dehumidification subsystem in fluid communication with said container such that said reduced salinity water stored therein can be used by an air capture device cooperative with said dehumidification subsystem to at least partially condense water contained in an ambient air supply; and a purified water storage tank fluidly coupled to said reverse osmosis subsystem and said dehumidification subsystem such that reduced salinity water produced by each is stored in said tank.

8. The apparatus of claim 7, further comprising a first positioning mechanism cooperative with said reverse osmosis subsystem such that at least one of said container and said reverse osmosis unit of said reverse osmosis subsystem can be raised and lowered in the saline water supply.

9. The apparatus of claim 8, further comprising a second positioning mechanism cooperative with said dehumidification subsystem such that said air capture device of said dehumidification subsystem can be preferentially oriented relative to the ambient air supply.

10. A method of purifying a saline water supply, said method comprising:

introducing a reverse osmosis subsystem comprising a saline water inlet, a purified water outlet fluidly downstream of said inlet and a membrane disposed fluidly between said inlet and said outlet into the saline water supply to a sufficient depth to promote reverse osmosis through said membrane by passing water from said saline water supply through said membrane substantially entirely by hydrostatic pressure inherent in said saline water supply;

condensing at least a portion of the moisture present in a supply of humid air by a passive dehumidification subsystem comprising a heat exchanger that uses said purified water produced by said reverse osmosis subsystem as a cooling liquid; and collecting purified water from said reverse osmosis subsystem and said dehumidification subsystem in at least one storage tank.

11. The method of claim 10, wherein said introducing a reverse osmosis subsystem comprises moving said reverse osmosis subsystem relative to said saline water supply during operation of said reverse osmosis subsystem to reduce brine concentration in the portion of the saline water supply adjacent to said reverse osmosis subsystem.

12. The method of claim 10, further comprising mounting said reverse osmosis subsystem, said dehumidification subsystem and said storage tank on a watercraft.

13. The method of claim 10, wherein said condensing at least a portion of the moisture present in a supply of humid air comprises orienting said heat exchanger relative to said supply of humid air to maximize heat exchange interaction therewith.

14. The method of claim 10, wherein said introducing a reverse osmosis subsystem to a sufficient depth comprises lowering said reverse osmosis subsystem to a first depth sufficient to create at least 600 pounds per square inch pressure at said membrane, and then lowering said reverse osmosis subsystem a rate to create about 1500 pounds per square inch pressure at said membrane.

15. The method of claim 14, wherein said lowering rate of said reverse osmosis subsystem between such time where said pressure on said membrane is at least 600 pounds per square inch and such time where said pressure on said membrane is about 1500 pounds per square inch is between about 1 foot per minute and about 60 feet per minute.

16. The method of claim 15, wherein said lowering rate between about 1 foot per minute and about 60 feet per minute is about 20 feet per minute.

17. The method of claim 10, wherein purified water produced by said reverse osmosis subsystem comprises potable water.

18. The method of claim 10, further comprising passively maximizing a temperature differential between said humid air and said purified water produced by said reverse osmosis subsystem such that upon establishment of thermal communication therebetween, said condensing is enhanced by said passive dehumidification subsystem.

* * * * *

UNITED STATES PATENT AND TRADEMARK OFFICE
CERTIFICATE OF CORRECTION

| | | |
|---|---|---|
| PATENT NO. | : 7,901,580 B2 | Page 1 of 1 |
| APPLICATION NO. | : 12/481082 | |
| DATED | : March 8, 2011 | |
| INVENTOR(S) | : Ival O. Salyer | |

It is certified that error appears in the above-identified patent and that said Letters Patent is hereby corrected as shown below:

Col 11, Line 39, "one another is in such" should read as -- one another in such --

Signed and Sealed this
Ninth Day of August, 2011

David J. Kappos
*Director of the United States Patent and Trademark Office*